Feb. 21, 1928.
S. A. NEIDICH
1,660,086
STOP MECHANISM
Filed June 30, 1926
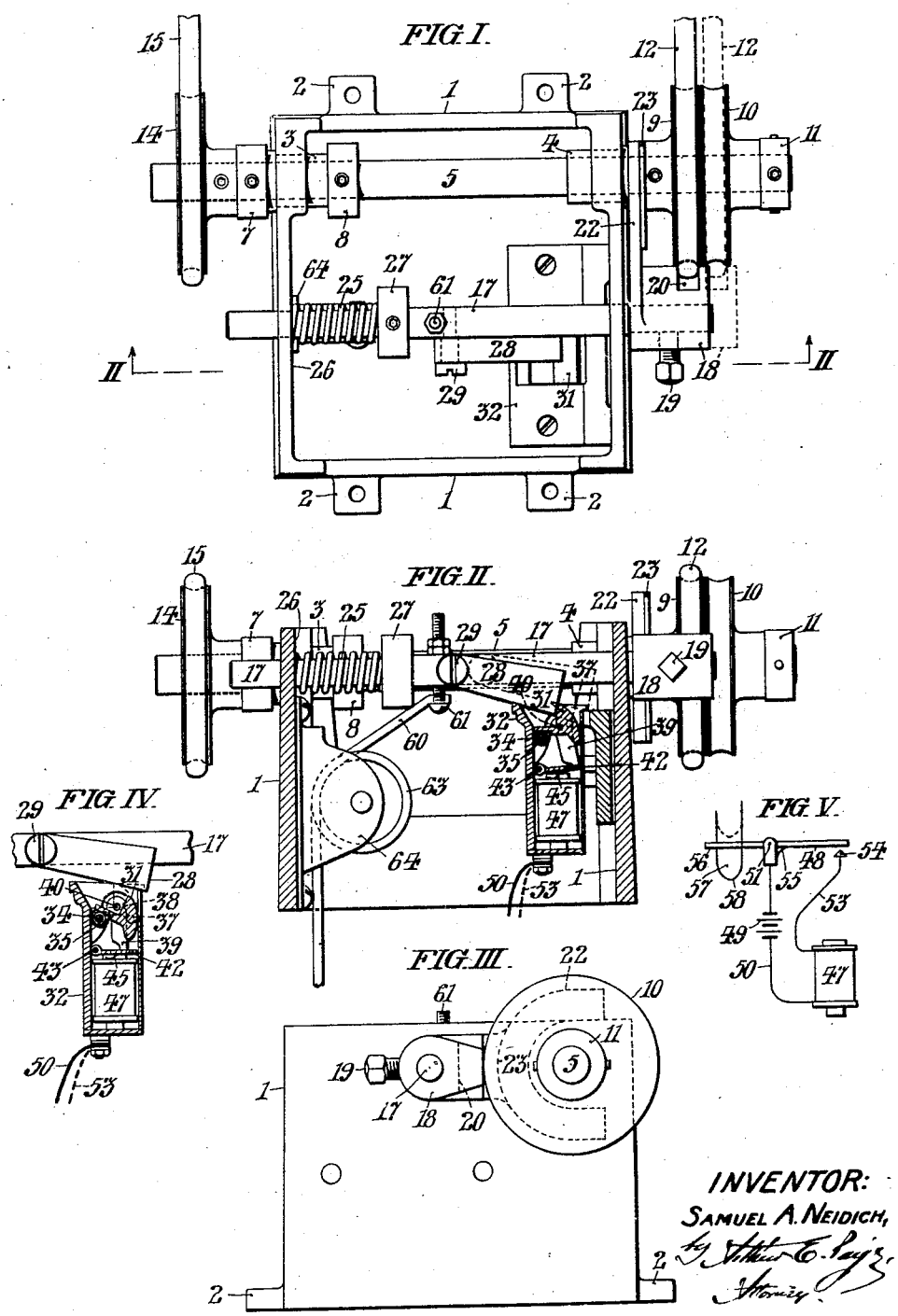
INVENTOR:
SAMUEL A. NEIDICH, Patented Feb. 21, 1928.

1,660,086

UNITED STATES PATENT OFFICE.

SAMUEL A. NEIDICH, OF EDGEWATER PARK, NEW JERSEY.

STOP MECHANISM.

Application filed June 30, 1926. Serial No. 119,590.

As hereinafter described, my invention comprises a power transmission device including a rotary shaft having two tight pulleys thereon, respectively for a motor driven belt and a driving belt, and one loose pulley to which said driven belt may be shifted; associated with a spring arranged to press a slide bar carrying a belt shifter, whereby said driven belt may be transferred to said idle pulley; said bar also carrying a brake, including a friction shoe which, contemporaneously with the shifting of the belt, is pressed against the tight pulley from which the belt is shifted, to stop the rotation thereof and thus stop the movement of the driving belt. The spring which is adapted to thus operate said shifter and brake, when released, is normally restrained by a detent, on said bar, engaged with an electric tripping device; so that when said electric tripping device is energized, said spring is released and the mechanism stopped as aforesaid.

My invention was designed for use in conjunction with viscose filament winding mechanism, of the character claimed in my copending application Serial No. 119,592 filed June 30, 1926 for Letters Patent of the United States for improvement in viscose filament takeup mechanism, to instantly stop the operation of a winding mechanism to prevent breakage of a filament being wound when, from any cause, the rate of winding exceeds the rate at which the filament is being automatically ejected from the medium in which it has been coagulated. However, my invention may be advantageously employed in any embodiment where it is desired to stop the movement of a driving belt as the consequence of closure of an electric circuit.

My invention includes the various novel features of construction and arrangement hereinafter more definitely specified.

In said drawings; Fig. I is a plan view of stop mechanism conveniently embodying my invention, with the parts in normal position in which power may be transmitted.

Fig. II is a vertical sectional view of said mechanism, taken on the line II, II in Fig. I.

Fig. III is an elevation of the right hand end of said mechanism, as shown in Figs. I and II.

Fig. IV is a vertical sectional view of the electric tripping device shown in Fig. II, but in the tripped position.

Fig. V is a diagram indicating an electric circuit including said tripping device and an electric switch which is normally open but which may be closed to operate the stop mechanism.

In said figures; the frame 1, which is conveniently a rectangular tube of cast iron open at top and bottom and having perforated lugs 2 by which it may be rigidly secured to any suitable support, has bearings 3 and 4 for the rotary shaft 5, which is the power transmitting shaft above contemplated. Said shaft is provided with collars 7 and 8 to prevent its axial movement and carries the tight pulley 9 which is rigidly connected therewith, adjoining the loose pulley 10 which is free to turn thereon but prevented from axial movement by the collar 11. Said shaft is normally arranged to be rotated by the belt 12 encircling said tight pulley 9 and said shaft is provided with the pulley 14, rigidly connected therewith, to drive the belt 15 leading to the filament winding mechanism or other mechanism which is to be stopped as above contemplated.

The slide bar 17 is mounted to reciprocate in said frame 1 parallel with said shaft 5 and has the belt shifter 18 rigidly connected therewith by the set screw 19. Said belt shifter 18 has the notch 20 in which said belt 12 is engaged to such an extent that it may be shifted by longitudinal movement of said bar 17, and said belt shifter 18 also carries the brake arm 22 which is provided with the friction shoe 23, conveniently formed of leather. The arrangement is such that when said bar 17 is shifted to transfer said belt 12 to the loose pulley 10 from the tight pulley 9; the latter is instantly stopped by pressure of said shoe 23 against the adjacent plane face of said pulley 9. Such movement is effected by the spring 25 which encircles said bar 17 between the side wall 26 of said frame 1 and the collar 27 which is rigidly connected with said bar 17. However, said spring 25 is normally compressed and restrained in the idle position shown, by the detent 28 which is pivoted at 29 upon said bar so that it normally gravitates into the position shown in Fig. II, in which it is engaged with the armature catch 31 of the electric tripping mechanism which is mounted in the casing 32 which is rigidly connected with said frame 1. Said armature catch is pivoted upon the shaft 34 in said casing 32 and normally pressed upwardly by the spring 35 encircling that shaft. Said catch 31 has the pin 37 projecting therefrom in position to normally engage the notch 38 in the latch 39 which is pivoted at 40 in said casing 32. Said latch 39 is normally held in the position to uphold said catch 31, by its pin 37, by means of the armature 42 which then prevents said latch from swinging to the left in Fig. II. Said armature is pivoted upon the shaft 43 in said casing 32 and is normally upheld in the position shown in Fig. II, by the spring 45 which is conveniently formed of a strip of sheet metal riveted at one end to said armature 42, and has its opposite end bearing upon the electromagnet 47.

As indicated in Fig. V, said electromagnet 47 is included in an electric circuit with the switch comprising the lever 48, and the source of electrical energy 49; such circuit including the conductor 50 leading to the fulcrum 51 of said switch 48, and the conductor 53 leading to the switch terminal 54. Said switch lever 48 is provided with the spring 55 by which it is normally held in the open position shown in Fig. V. However, the arm 56 of said switch lever extends through the bight 57 of the filament 58, and the arrangement is such that when said switch lever arm 56 is uplifted by contraction of said bight from the position shown in full lines to the position shown in dotted lines in Fig. V; said circuit including the electromagnet 47 and source of energy 49 is closed by contact of said switch lever 48 with said terminal 54. When said electromagnet 47 is thus energized; it draws down said armature 42, thus releasing said latch 39 so that the latter is free to swing to the left in Fig. II, from the position shown in that figure to the position shown in Fig. IV, to thus release the pin 37 from the notch 38 and permit the catch 31 to be turned downwardly to the released position shown in Fig. IV; to thus release the detent 28 and permit the spring 25 to expand and thrust said slide bar 17 to the right in Figs. I and II, thus moving the belt shifter 18 from the position shown in full lines in Fig. I to the position shown in dotted lines in said figure, with the effect of shifting said belt 12 from the tight pulley 9 to the loose pulley 10 and simultaneously stopping the movement of said belt 15 by engagement of the brake shoe 23 with said pulley 9.

It is to understood that when released as above described, said catch 31 is thrown down to the position shown in Fig. IV by said detent 28 as the latter is thrust over it by said spring 25 from the position shown in Fig. II to the position shown in Fig. IV and against the stress of the spring 35 which continually tends to upturn said latch 31 to the initial position shown in Fig. II. Although said spring 45 continually tends to uplift the armature 42 to the initial position shown in Fig. II; said armature is not free to be thus uplifted until said latch 39 is returned to the right, from the position shown in Fig. IV to the position shown in Fig. II, and such return movement of the latch 39 is effected by the pin 37 upon the catch 31 when it reaches said notch 38. When said latch 39 is thus automatically returned to the right to the normal position shown in Fig. II in which its lower end overhangs the right hand edge of the armature 42, the latter is then free to be uplifted to hold said latch 39 in the normal position shown in Fig. II, until said armature is again drawn down by energizing the electromagnet 47. When said catch 31 is upturned to its normal position shown in full lines in Fig. II and in dotted lines in Fig. IV; the parts may be restored to their normal operative position by again withdrawing said slide bar 17 to the left, from the position shown in Fig. IV to the position shown in Fig. II. Such movement may be effected by manually thrusting said belt shifter 18, but is more conveniently effected by means of the flexible connector 60 which is attached to the screw 61 depending from said bar 17, and extends over the sheave 63 which is journaled in the bracket 64 attached to said frame 1. Said connector 60 may extend to a foot lever whereby said stop mechanism may be reset as above described, to its normal operative position shown in Figs. I and II.

Although I prefer to construct and arrange my invention as above described; it is to be understood that various modifications may be made therein without departing from the essential features of my invention, as defined in the appended claims.

I claim:

1. In stop mechanism, the combination with a frame having alined bearings; of a rotary power transmission shaft journaled in said bearings and having two tight pulleys thereon, respectively for a motor driven belt and for a driving belt, and one loose pulley to which said driven belt may be shifted; a slide bar mounted to reciprocate in said frame, parallel with said shaft, and carrying a belt shifter; a spring arranged to shift said bar when released; whereby said driven belt may be transferred to said loose pulley; brake means on said bar arranged to be pressed against the tight pulley from which the belt is shifted, to stop the rotation thereof and thus stop the movement of said driving belt, when said spring is released; an electric tripping device including a casing, in said frame, containing an electromagnet, an armature for said magnet, a latch, arranged to be held in one extreme position by engagement with said armature, a catch, arranged to swing said latch to and from engagement with said armature, a spring arranged to normally upturn said catch in said casing; a detent, on said bar, arranged to engage said electric tripping device catch; so that when said electromagnet is energized, said detent and spring are released and said shaft stopped by shifting said belt and braking said pulley; and means arranged to energize said electromagnet, comprising a circuit including said electromagnet, a source of energy and a switch.

2. In stop mechanism, the combination with a frame; of a rotary power transmission shaft journaled in said frame and having tight and loose pulleys thereon; a slide bar mounted to reciprocate in said frame, parallel with said shaft, and carrying a belt shifter; a spring, arranged to shift said bar when released; whereby a belt may be transferred from a tight pulley to said loose pulley; brake means on said bar arranged to be pressed against the tight pulley from which the belt is shifted, to stop the rotation of said shaft, when said spring is released; an electric tripping device including an electromagnet, an armature for said magnet, a catch, and a spring arranged to normally upturn said catch; a detent, for said bar, arranged to normally engage said catch; so that when said electromagnet is energized, said detent and spring are released and the shaft stopped by shifting said belt and braking said pulley; and means arranged to energize said electromagnet, comprising a circuit including said electromagnet, a source of energy and a switch.

3. In stop mechanism, the combination with a frame; of a rotary power transmission shaft journaled in said frame and having tight and loose pulleys thereon; a slide bar mounted to reciprocate in said frame, and carrying a belt shifter; a spring, arranged to shift said bar when released; whereby a belt may be transferred from a tight pulley to a loose pulley; brake means on said bar arranged to be pressed against the tight pulley from which the belt is shifted, to stop the rotation of said shaft, when said spring is released; an electric tripping device including an electromagnet, a catch, and a spring arranged to normally upturn said catch; a detent, for said bar, arranged to normally engage said catch; so that when said electromagnet is energized, said detent and spring are released and the shaft stopped by shifting said belt and braking said pulley; and means arranged to energized said electromagnet, comprising a circuit including said electromagnet, a source of energy and a switch.

4. In stop mechanism, the combination with a frame; of a rotary power transmission shaft journaled in said bearings and having two tight pulleys thereon, respectively for a motor driven belt and for a driving belt; a slide bar mounted to reciprocate in said frame; a spring, encircling said slide bar, arranged to shift said bar when released; a brake on said bar arranged to be pressed against one of said tight pulleys to stop the rotation thereof and thus stop the movement of said driving belt, when said spring is released; an electric tripping device including a catch and an electromagnet arranged to release said catch; a detent for said bar, arranged to engage said catch; so that when said electromagnet is energized, said detent and spring are released and said shaft stopped by shifting said bar and braking said pulley; and means arranged to energize said electromagnet, comprising a circuit including said electromagnet, a source of energy and a switch.

5. In stop mechanism, the combination with a power transmission device including a rotary shaft having a tight pulley and a loose pulley thereon; a slide bar carrying a belt shifter and brake; a spring arranged to shift said bar when released; whereby a belt may be transferred from said tight pulley to said loose pulley; a detent for said bar; a catch arranged to normally engage said detent; an electric tripping device, including an electromagnet, arranged to release said catch from said detent; a spring arranged to normally present said catch in operative position; and a circuit including said electromagnet, a source of energy, and a switch; whereby said stop mechanism may be operated by said switch.

6. The combination with a power transmission shaft; of a pulley rigidly connected with said shaft; a slide bar mounted to reciprocate parallel with said chaft and carrying a belt shifter and a brake; a spring arranged to press said bar to shift a belt from said pulley and apply said brake to said pulley; a detent, carried by said bar, on a horizontal pivot, and arranged to gravitate into operative position; a catch arranged to engage said detent and restrain said spring from operating; an electrically operative tripping device arranged to release said catch from said detent; and switch means arranged to operate said tripping device.

In testimony whereof, I have hereunto signed my name at Burlington, New Jersey, this 17th day of May, 1926.

SAMUEL A. NEIDICH.